US010391829B2

(12) United States Patent
Steber et al.

(10) Patent No.: US 10,391,829 B2
(45) Date of Patent: Aug. 27, 2019

(54) ASSEMBLY CONSISTING OF A FRAME ELEMENT, A CONNECTING ELEMENT AND A PART SECURED TO THE CONNECTING ELEMENT (71) Applicant: Bayerische Motoren Werke Aktiengesellschaft, Munich (DE)

(72) Inventors: Gerhard Steber, Munich (DE); Christian Marmodee, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 175 days.

(21) Appl. No.: 15/178,710

(22) Filed: Jun. 10, 2016

(65) Prior Publication Data
US 2016/0280030 A1 Sep. 29, 2016

Related U.S. Application Data (63) Continuation of application No. PCT/EP2014/076257, filed on Dec. 2, 2014.

(30) Foreign Application Priority Data

Dec. 13, 2013 (DE) .................. 10 2013 225 912

(51) Int. Cl.
*B60G 7/02* (2006.01)
*B60G 11/24* (2006.01)

(52) U.S. Cl.
CPC ............ *B60G 11/24* (2013.01); *B60G 7/02* (2013.01); *B60G 2204/143* (2013.01); *B60G 2204/41* (2013.01); *B60G 2204/4302* (2013.01); *B60G 2206/60* (2013.01); *B60G 2206/7101* (2013.01); *B60G 2206/821* (2013.01)

(58) Field of Classification Search
CPC .... B60G 11/24; B60G 7/02; B60G 2204/143; B60G 2204/41; B60G 2204/4302
See application file for complete search history.

(56) References Cited

U.S. PATENT DOCUMENTS 2,308,967 A * 1/1943 Kuss .................. B60G 7/00
267/270
3,073,620 A 1/1963 Beck
(Continued)

FOREIGN PATENT DOCUMENTS

DE 38 74 084 T2 4/1993
DE 197 13 043 A1 1/1998
(Continued)

OTHER PUBLICATIONS

International Search Report (PCT/ISA/210) issued in PCT Application No. PCT/EP2014/076257 dated Jun. 23, 2015 with English translation (Six (6) pages).
(Continued)

*Primary Examiner* — Faye M Fleming
(74) *Attorney, Agent, or Firm* — Crowell & Moring LLP (57) ABSTRACT

An assembly includes a motor vehicle frame element, a connecting element that is secured to the frame element, and a part that is secured to the connecting element. An integral bond between the connecting element and the frame element and/or the connecting element is/are designed in such a way that the elastic modulus thereof is smaller than the elastic modulus of the part.

17 Claims, 10 Drawing Sheets

(56) References Cited

U.S. PATENT DOCUMENTS

| | | | |
|---|---|---|---|
| 3,139,275 A | 6/1964 | Burkitt | |
| 5,775,719 A * | 7/1998 | Holden | B60G 7/02 280/86.75 |
| 5,899,498 A | 5/1999 | Horton | |
| 5,944,441 A | 8/1999 | Schuetze | |
| 6,189,904 B1 * | 2/2001 | Gentry | B60G 11/08 267/149 |
| 9,114,681 B2 * | 8/2015 | Brun | B60G 7/02 |
| 2001/0009321 A1 * | 7/2001 | Toyoshima | B60G 7/005 280/86.75 |
| 2007/0284841 A1 * | 12/2007 | Kunze | B60G 7/001 280/124.135 |
| 2011/0001350 A1 * | 1/2011 | Schmitz | B60G 9/003 301/124.1 |
| 2011/0266837 A1 | 11/2011 | Loesch et al. | |
| 2013/0154227 A1 | 6/2013 | Lindtner | |
| 2013/0154310 A1 | 6/2013 | Neumann et al. | |
| 2014/0108754 A1 | 4/2014 | Kawaguchi et al. | |
| 2014/0175767 A1 | 6/2014 | Girelli Consolaro et al. | |
| 2014/0232143 A1 | 8/2014 | Renner et al. | |

FOREIGN PATENT DOCUMENTS

| | | | |
|---|---|---|---|
| DE | 695 27 376 T2 | 2/2003 | |
| DE | 10 2005 030 100 A1 | 2/2006 | |
| DE | 603 06 473 T2 | 2/2007 | |
| DE | 10 2008 061 490 B3 | 8/2010 | |
| DE | 10 2011 051 115 A1 | 12/2012 | |
| DE | 10 2012 219 002 A1 | 4/2014 | |
| EP | 0 013 234 A1 | 7/1980 | |
| EP | 0 315 606 A1 | 5/1989 | |
| EP | 0 607 885 A2 | 7/1994 | |
| EP | 2 527 231 A2 | 11/2012 | |
| EP | 2 604 453 A1 | 6/2013 | |
| GB | 511715 | 8/1939 | |
| GB | 1 444 768 | 8/1976 | |
| JP | 2002012014 A * | 1/2002 | B60G 7/02 |
| JP | 2002-137603 A | 5/2002 | |
| WO | WO 88/04239 A1 | 6/1988 | |
| WO | WO 2011/035860 A1 | 3/2011 | |
| WO | WO 2013/060514 A1 | 3/2013 | |
| WO | WO 2014/029541 A1 | 2/2014 | |

OTHER PUBLICATIONS

German-language Written Opinion (PCT/ISA/237) issued in PCT Application No. PCT/EP2014/076257 dated Jun. 23, 2015 (Six (6) pages).

German-language Search Report issued in counterpart German Application No. 10 2013 225 912.3 dated Jul. 15, 2015 with partial English translation (Twelve (12) pages).

Chinese Office Action issued in counterpart Chinese Application No. 201480053623.3 dated Jan. 19, 2017 with English translation (13 pages).

* cited by examiner

ASSEMBLY CONSISTING OF A FRAME ELEMENT, A CONNECTING ELEMENT AND A PART SECURED TO THE CONNECTING ELEMENT

CROSS REFERENCE TO RELATED APPLICATIONS

This application is a continuation of PCT International Application No. PCT/EP2014/076257, filed Dec. 2, 2014, which claims priority under 35 U.S.C. § 119 from German Patent Application No. 10 2013 225 912.3, filed Dec. 13, 2013, the entire disclosures of which are herein expressly incorporated by reference.

This application contains subject matter related to U.S. application Ser. No. 15/178,681, entitled "Assembly Comprising a Frame Element and a Connecting Element, and Method for Securing a Connecting Element to a Frame Element", and U.S. application Ser. No. 15/178,687, entitled "Support Structure in a Framework Construction, and Method for Producing Same" filed on even date herewith.

BACKGROUND AND SUMMARY OF THE INVENTION

The present invention relates to an assembly consisting of a frame element of a motor vehicle, a connecting element and a component fastened to the connecting element. In particular, the invention also relates to a chassis of a motor vehicle which includes such an assembly.

Figure 8:
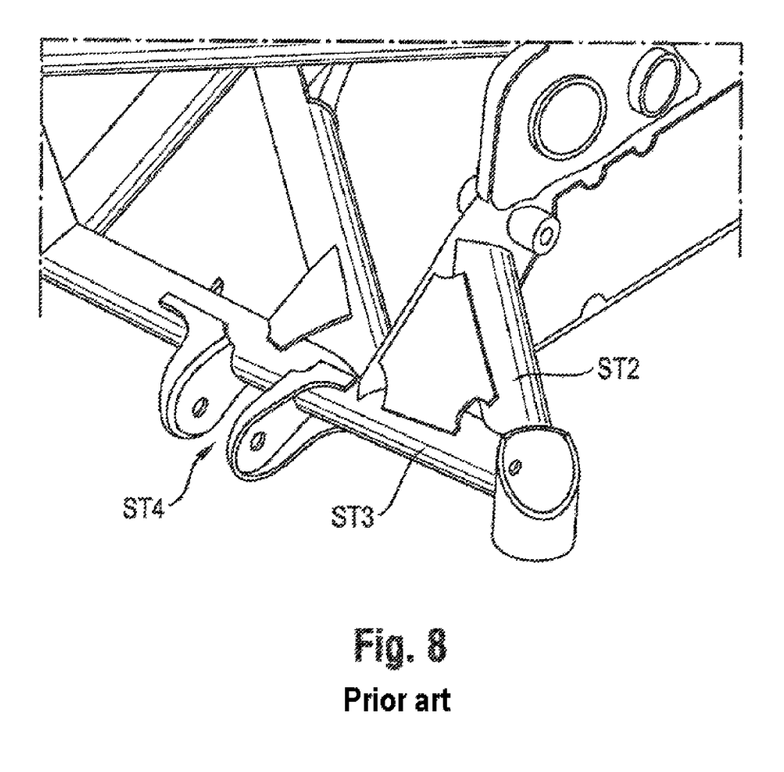
FIG. 8 shows a frame construction or a chassis of a motor vehicle according to the prior art.

In the automotive industry, or in the manufacture of motor vehicles, various portions of the motor vehicle are made from appropriate frame structures. An example of such a frame construction is the chassis of a motor vehicle shown in FIG. 8. The corresponding frame construction is formed by means of various frame elements ST2, ST3 which are connected to one another. In order to attach the wheel suspensions, for example, connecting elements ST4 are provided on the frame structure at certain points, to which connecting elements there can be fastened corresponding links of the wheel suspension and/or struts. In order to fasten the links or struts, use is often made of rubber bearings so that compressive or tensile loading can be absorbed to a certain degree.

The use of such rubber bearings increases the weight on the one hand and leads to an increase in the parts making up the chassis on the other hand.

Against this background, it is an object of the present invention to provide an assembly which leads to a weight reduction and simplification of the assembly.

This object is achieved by an assembly which includes a frame element of a motor vehicle; a connecting element which is fastened to the frame element; and a component which is fastened to the connecting element; wherein an integrally bonded connection, which is provided between the connecting element and the frame element, and/or the connecting element are/is formed in such a way that they have a modulus of elasticity which is less than a modulus of elasticity of the component.

Further preferred embodiments of the assembly according to the invention are described and claimed herein.

According to the invention, the assembly includes a frame element of a motor vehicle and a connecting element which is fastened to the frame element. A component is, in turn, fastened to the connecting element.

An integrally bonded connection, which is present between the frame element and the connecting element, and/or the connecting element of the assembly according to the invention, are/is formed such that the integrally bonded connection and/or the connecting element have/has a modulus of elasticity which is less than a modulus of elasticity of the component.

This configuration of the integrally bonded connection and/or of the connecting element means that they have an elastic property that effectively assumes the function of an elastomer bearing, for example a rubber bearing. In other words, the integrally bonded connection and/or the connecting element are formed such that they are more elastic than the component fastened to the connecting element and, in this respect, when an intended force is introduced into the frame element via the component and the connecting element, there occurs a greater elastic deformation of the integrally bonded connection and/or of the connecting element than of the component.

This configuration according to the invention of the assembly means that it is not necessary to provide a separate elastomer bearing, for which reason there results a weight reduction, a simplification of the entire assembly and a reduction in the number of parts.

The frame element of the motor vehicle can be formed from metal or a fiber-reinforced plastic, it being possible for the frame element to have a cross section which is tubular or else formed differently.

The fibers reinforcing the frame element can be short fibers (0.1 to 1 mm), long fibers (1 to 50 mm) or endless fibers (>50 mm).

The integrally bonded connection can be produced, for example, by an adhesive. A variety of adhesives can be used in dependence on the intended loading of the assembly according to the invention or on the magnitude of the forces which act as intended. Examples thereof are very high-modulus adhesives with a modulus of elasticity >800 MPa, high-modulus adhesives with a modulus of elasticity of 100 to 800 MPa and also low-modulus elastic adhesives with a modulus of elasticity of <100 MPa.

In addition, the adhesive can be cold- or warm-curing.

The connecting element can also be configured differently with respect to geometry and material in dependence on the intended loading. Materially, the connecting element can be formed, for example, from a metal, a fiber-reinforced plastic (fiber lengths as explained in respect of the frame element), a stiff adhesive and also from an elastomer.

By combining the above-explained configuration of the integrally bonded connection and of the connecting element, a necessary elasticity for the intended loading and the intended use of the assembly can be achieved.

Preferred configurations are:

1) connecting element made of elastomer with a certain modulus of elasticity (to assume the elastic function) with/without the envelope explained in more detail below, the fastening of the connecting element to the frame element being arbitrary;

2) the combination of connecting element made of metal/fiber-reinforced plastic and integrally bonded connection with a certain modulus of elasticity (to assume the elastic function); and 3) connecting element made of an elastomer with a certain modulus of elasticity (to assume the elastic function), which itself functions as an adhesive and via which the connecting element is fastened to the frame element, with/without the envelope.

The connecting element can be configured differently in dependence on the intended use of the assembly. If the connecting element is, for example, a connecting element provided for fastening a link of a wheel suspension, it can have one or two attachment portions to which the link of the wheel suspension can be fastened via a screw connection. The attachment portions can be individual parts or provided together on a bearing portion which is brought into bearing contact with the frame element. Should the attachment portions each be individual parts, they can also have a laterally extending bearing portion.

Moreover, the connecting element can also be configured such that the attachment portions have a counter-holder by which they together enclose the frame element.

The integrally bonded connection is produced via the adhesive between the connecting element and the frame element.

According to the invention, the integrally bonded connection and/or the connecting element are/is geometrically formed in such a way that the integrally bonded connection and/or the connecting element have/has a force-extension characteristic of an elastomer bearing. The force-extension characteristic is, in particular, a conventional force-displacement characteristic.

As a result, the behavior of an elastomer bearing, such as, for example, a rubber bearing, can be readily integrated into the assembly.

According to the invention, the connecting element can be formed from an elastomer. In this case, the connecting element can be indirectly fastened to the frame element via the integrally bonded connection or an adhesive. If the elastomer itself functions as an adhesive, the connecting element can be most readily directly fastened to the frame element.

In a preferred configuration of the assembly according to the invention, the integrally bonded connection is formed from a low-modulus adhesive which has, in particular, a modulus of elasticity which is less than 100 MPa.

Such an adhesive is particularly suitable for use in the field of chassis construction since the properties of an elastomer bearing can be readily reproduced thereby.

According to a further preferred configuration of the assembly according to the invention, the connecting element is formed from an elastomer and surrounded by an envelope which has a modulus of elasticity which is greater than the modulus of elasticity of the elastomer. The envelope is preferably formed from an upper and lower shell.

This configuration according to the invention makes it possible to ensure that the connecting element behaves differently in dependence on tensile and compressive loading. In particular, in the case of tensile loading, the connection between the frame element and the connecting element is supported in such a way that the risk of tear-off of the connection is reduced.

According to a further preferred assembly of the invention, the integrally bonded connection is formed from an adhesive and the connecting element is formed from a metal, wherein an adhesive layer formed from the adhesive and situated between the frame element and the connecting element has a thickness of up to 10 mm, in particular between 1 mm and 10 mm.

By forming the connecting element from metal it can be ensured that the component is readily fastened to the connecting element. In this preferred configuration of the assembly according to the invention, the adhesive layer, which has a thickness of up to 10 mm, assumes the function of the elastomer bearing.

In a further preferred configuration of the assembly according to the invention, the connecting element is formed from an elastomer and has a through-opening at which the component can be fastened via a screw connection, wherein a reinforcing ring is inserted into the through-opening. Whereas the connecting element made of the elastomer assumes the function of the elastomer bearing, it is possible to achieve ready fastening of the component to the connecting element via the reinforcing ring.

In a further preferred configuration of the assembly according to the invention, in addition to the integrally bonded connection, the connecting element is fastened to the frame element by a fiber winding.

The fiber winding can be formed, for example, by a carbon fiber, glass fiber, aramid fiber or natural fiber. Moreover, the fiber winding can be formed by an individual fiber or else by a plurality of fibers.

Moreover, the fiber winding can be embedded in a plastic matrix consisting of a thermoset or thermoplastic.

Moreover, the fiber winding can be formed such that the fiber forming the fiber winding is wound around the frame element and the connecting element in such a way that fiber portions on the surface of the frame element or of the connecting element extend parallel to one another or else cross over one another.

Generally, the fiber winding can be produced in such a way that the fiber forming the fiber winding extends perpendicularly to a longitudinal direction of the frame element. If the fiber winding is built up from a plurality of individual fibers, it is also possible for the individual fibers to cross one another. In other words, the fiber(s) can form geodetic lines which connect points which lie at the same height with respect to the longitudinal direction or are offset from one another.

The surface on which the fiber winding extends can have concave portions, for example grooves, to secure and position the fiber winding.

In the case that the connecting element is enclosed by the above-explained envelope, this envelope ensures that there is no risk of the fiber winding being released on account of the elastic movement of the connecting element or of the integrally bonded connection.

In a further preferred configuration of the assembly according to the invention, the integrally bonded connection is formed from an adhesive and the frame element extends in a longitudinal direction. An adhesive layer formed from the adhesive and situated between the frame element and the connecting element is preferably formed in such a way that a quantity of the adhesive increases at end portions of the connecting element which are situated in the longitudinal direction.

For example, the connecting element is configured such that a gap between the frame element and the connecting element in which the adhesive is situated becomes larger at the end portions of the connecting element which are situated in the longitudinal direction. This can be achieved by virtue of the connecting element having on the bearing surface, by which it bears against the frame element, tapering and/or else stepped—preferably multiply stepped—end portions.

Furthermore, for example, an excess of the adhesive can be applied in such a way that a bead is created at the end portions.

The invention also relates to a chassis of a motor vehicle, wherein the chassis includes an assembly in accordance with the above explanation.

All the explanations given above, in particular with respect to the modulus of elasticity, materials of the frame element and connecting element, and the fiber winding correspondingly apply to the following embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
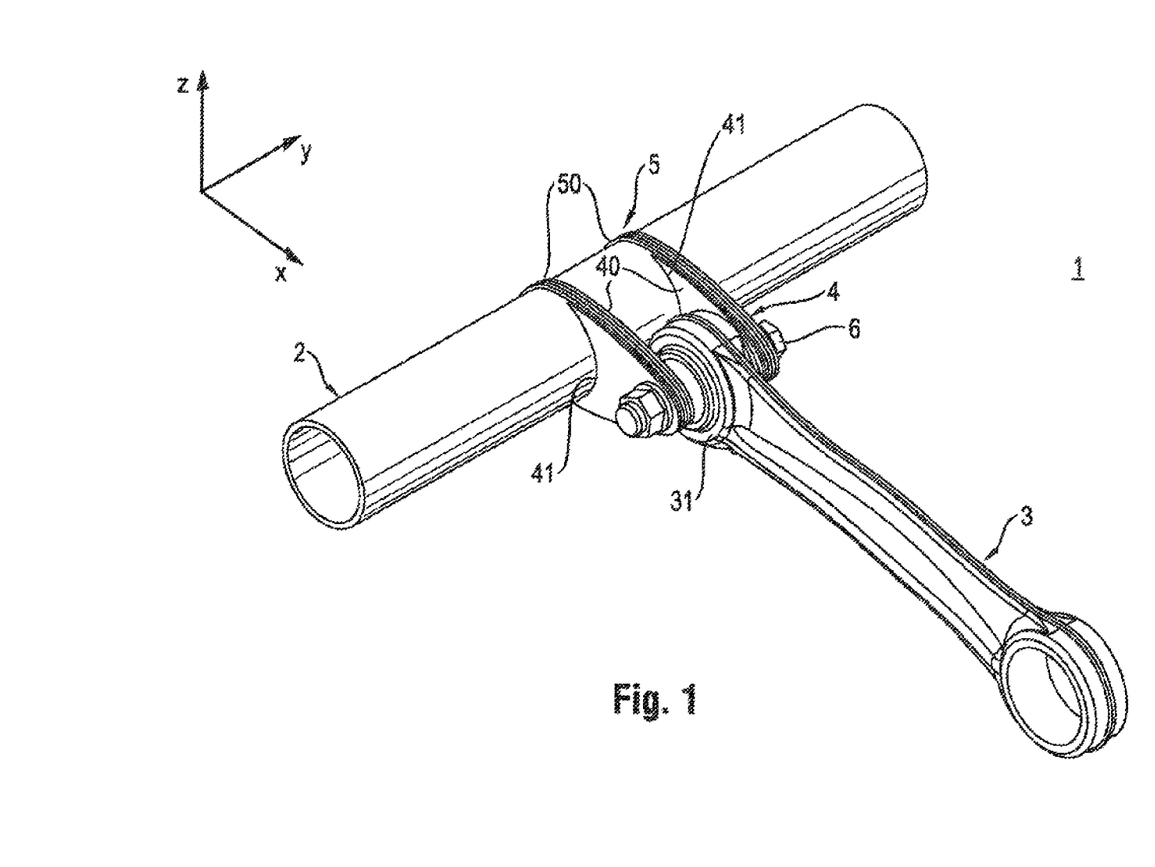
FIG. 1 shows an assembly according to an embodiment of the invention consisting of a frame element to which a link is fastened via a connecting element.

An assembly 1 according to the invention is shown in FIG. 1. The assembly 1 includes a frame element 2 to which a component 3, for example a link, is fastened via a connecting element 4.

In this embodiment, the frame element 2 is formed from a fiber-reinforced plastic and has a tubular cross section. However, the frame element 2 can also be formed from a metal and can, moreover, also have cross sections of different type.

In the assembly illustrated, the component 3 is a link which belongs, for example, to a wheel suspension. The link 3 is indirectly fastened to the frame element 2 via the connecting element 4. The link 3 is directly fastened to the connecting element 4 via the screw connection 6 illustrated. For this screw connection 6, the connecting element 4 has two attachment portions 40 which each have a through-opening through which the screw connection 6 extends. As can be seen from FIG. 1, the screw connection 6 passes through a ring 31, which is directed toward the frame element 2, of the link 3 in such a way that the link 3 is fastened to the connecting element and the fastening or the bearing of the link 3 has one degree of freedom (rotation).

During the operation of the corresponding vehicle, forces are introduced into the frame element 2 via the link 3 illustrated. To ensure that the connecting element 4 or the link 3 is not subject to excess wear, it is advantageous for the link 3 to be elastically mounted on the connecting element 4. However, this elastic mounting is primarily provided to maintain a certain degree of ride comfort and to avoid excess generation of noise during driving operation. As will be illustrated more precisely below, this elastic mounting is not realized using an elastomer bearing or rubber bearing in the assembly 1 shown in FIG. 1, but rather by the material-related configuration of the connecting element 4 and/or of an integrally bonded connection provided between the frame element 2 and the connecting element 4.

Figure 2A:
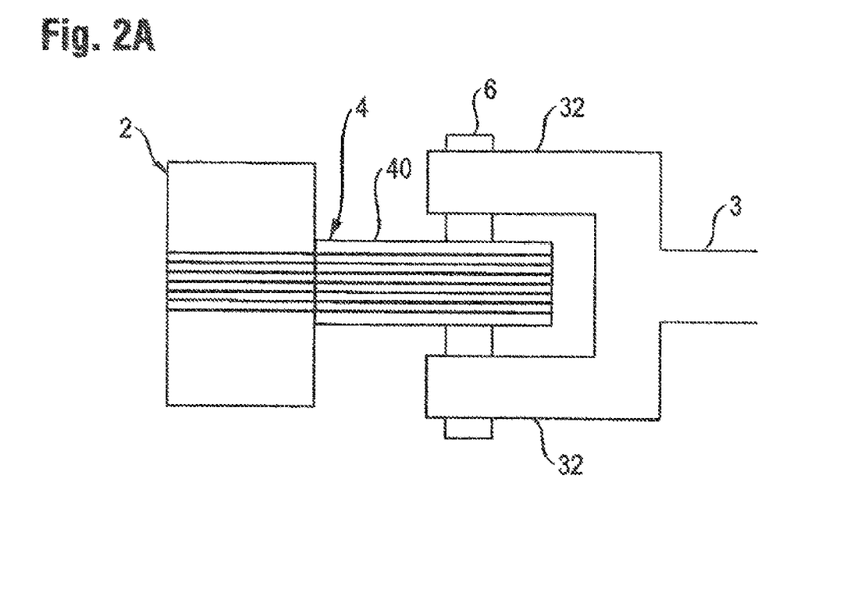
FIGS. 2A and 2B show two different variants of the assembly according to embodiments of the invention, the link fastened to the connecting element being designed differently in the two illustrated variants.
Figure 2B:
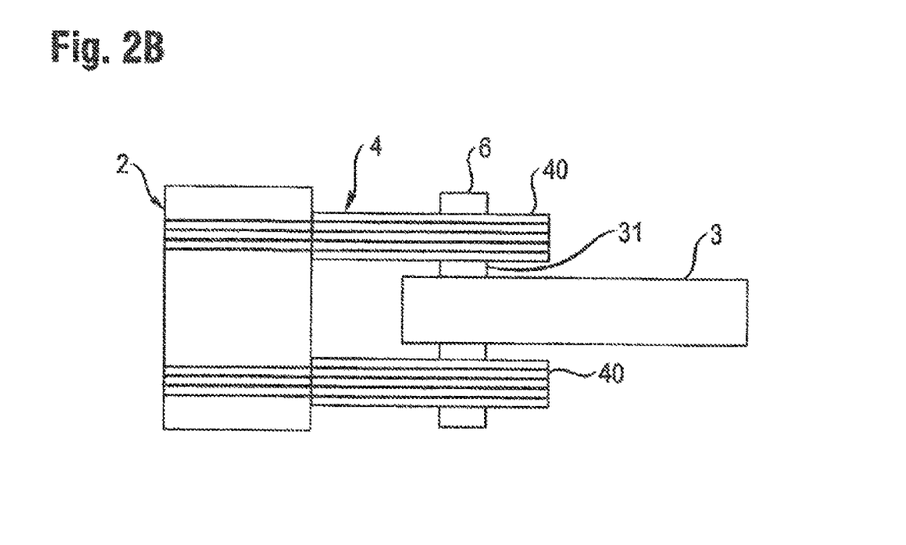

FIGS. 2A and 2B show alternative possibilities of fastening the link 3 to the connecting element 4. Whereas in FIGS. 1 and 2B the connecting element 4 is formed from two attachment portions 40 which are independent of one another and between which the ring 31, which is directed toward the frame element 2, of the link 3 is situated, through which ring the screw connection 6 extends, there is the possibility, as shown in FIG. 2A, of configuring the link 3 in such a way that it has two spaced-apart legs 32 between which the attachment portion 40 of the connecting element 4 is situated. Through-openings for the screw connection 6 are situated in the legs 32 of the link 3. The screw connection 6 passes through the through-openings formed in the legs 32 and through a through-opening present in the attachment portion 40, with the result that the link 3 is fastened to the attachment portion 40 and the fastening/mounting has one degree of freedom (rotation).

Returning to FIG. 1, the assembly 1 furthermore includes the connecting element 4 via which the link 3 is fastened indirectly to the frame element 2. As already mentioned, in the variant shown in FIG. 1, the connecting element 4 has two attachment portions 40 which each bear against the frame element 2 by way of a bearing surface 41 directed toward the frame element. The attachment portions 40 have a profile situated in the X-Z plane shown in FIG. 1 such that the attachment portions 40 bear flat against the frame element 2 by way of their bearing surfaces 41.

Between the bearing surfaces 41 and the frame element 2 there is preferably situated an adhesive layer which forms an integrally bonded connection between the attachment portions 40 and the frame element. As will be explained in more detail below, the adhesive layer can assume the function of an elastomer bearing.

In addition to the integrally bonded connection, the connecting element 4 can also be fastened to the frame element 2 via a fiber winding 5. In the variant of the connecting element 4 shown in FIG. 1, each of the attachment portions 40 is fastened to the frame element 2 by a winding 50 in addition to the integrally bonded connection. The windings 50 are produced by a fiber being wound around the frame element and the corresponding attachment portion 40. The fiber corresponding to the winding 50 can either be impregnated in a plastic matrix (thermoplastic or thermoset) or wound untreated around the frame element 2 and the corresponding attachment portion 40. If the fiber is wound untreated around the frame element 2 and the corresponding attachment portion 40, the plastic matrix can be applied subsequently.

Different variants of the connecting element 4 are explained below with reference to FIGS. 3A to 3F.

Figure 3A:
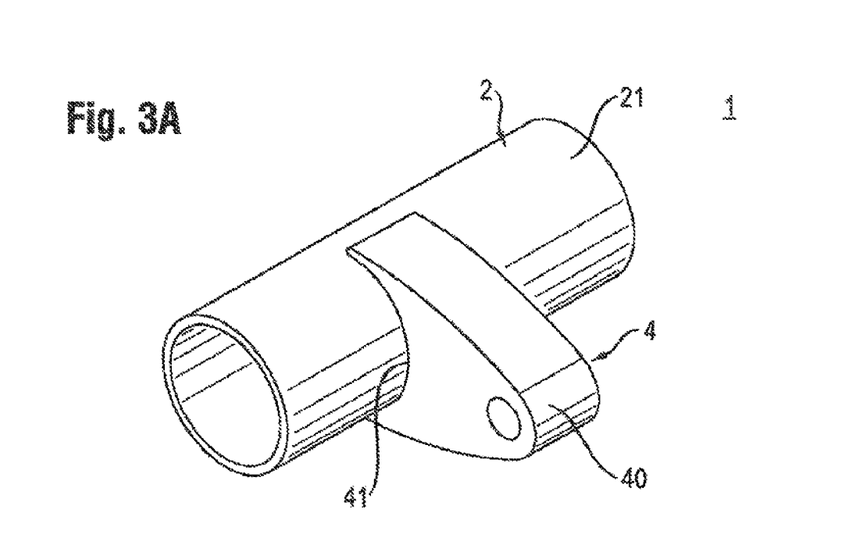
FIGS. 3A to 3F show different variants of the connecting element of the assembly according to embodiments of the invention.

The connecting element shown in FIG. 3A corresponds to that shown in FIG. 2A. That is to say that the connecting element 4 has a single attachment portion 40 which is arranged as intended between the legs 32 shown in FIG. 2A.

The bearing surface 41 of the attachment portion 40 that is directed toward the frame element 2 bears flat against the circular outer surface 21 of the frame element 2. Compared with the attachment portions 40 shown in FIG. 1, the attachment portion 40 shown in FIG. 3A is designed to be thicker in the longitudinal direction (Y direction).

The fiber winding is not present in FIG. 3A, but can also be provided.

Figure 3B:
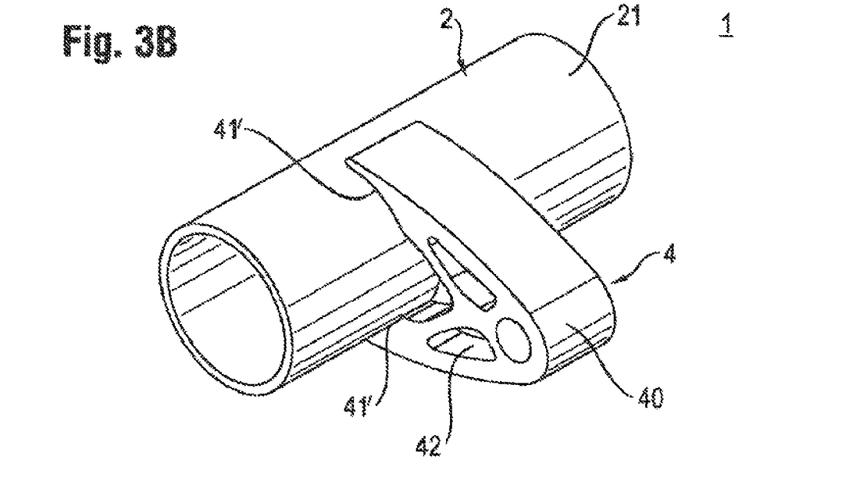

The connecting element 4 shown in FIG. 3B corresponds to that shown in FIG. 3A, with cutouts or apertures 42 additionally being formed in the attachment portion 40. The apertures 42 are provided for weight reduction and, in dependence on the intended direction of force flow (X direction), are situated at lesser loaded portions of the connecting element 40. In this respect, the apertures 42 or cutouts constitute weight optimization measures.

The connecting element 4 shown in FIG. 3B bears against the frame element 2 by way of two bearing surfaces 41'. The bearing surfaces 41' directed toward the frame element 2 are therefore separated from one another because one of the apertures 42 is situated on the side facing the frame element 2.

In the variant shown in FIG. 3B, the fiber winding 5 is likewise omitted, but can be provided as required.

Figure 3C:
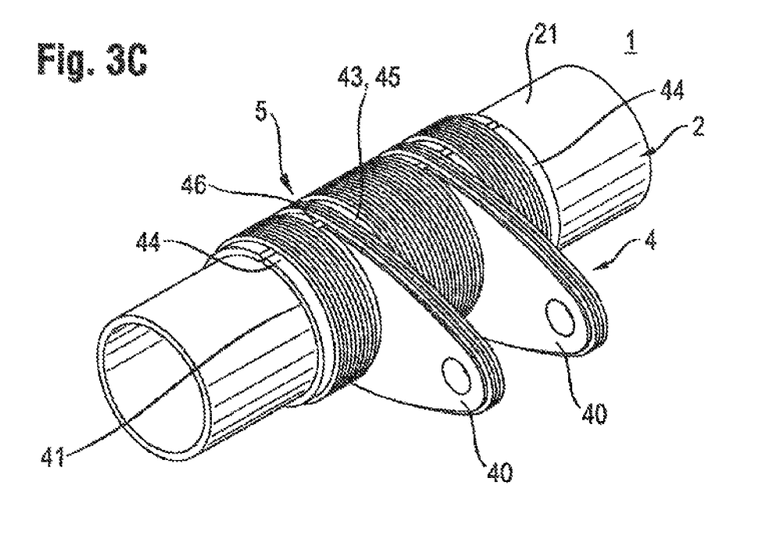

A further variant of the connecting element 4 is shown in FIG. 3C. In this variant, the attachment portions 40 are formed on a bearing portion 43 extending in the longitudinal direction (Y direction). The bearing portion 43 is adapted to the outer surface 21 of the frame element 2 and bears flat against it. The attachment portions 40 are formed on the bearing portion 43 such that external outer portions 44 of the bearing portion 43 which extend in the longitudinal direction are formed on the mutually opposed sides of the attachment portions 40. A connecting portion 45 of the bearing portion 43 is situated between the attachment portions 40.

The bearing portion 43 is supplemented by a counter-element 46 in such a way that, apart from a gap formed between them, the bearing portion 43 and the counter-element 46 completely encircle the frame element 2.

In the variant shown in FIG. 3C, the fiber winding 5 has five windings, with in each case a winding extending over the outer portions 44, a fiber winding extending over the connecting portion 45 and in each case a winding extending over the attachment portions 40.

Figure 3D:
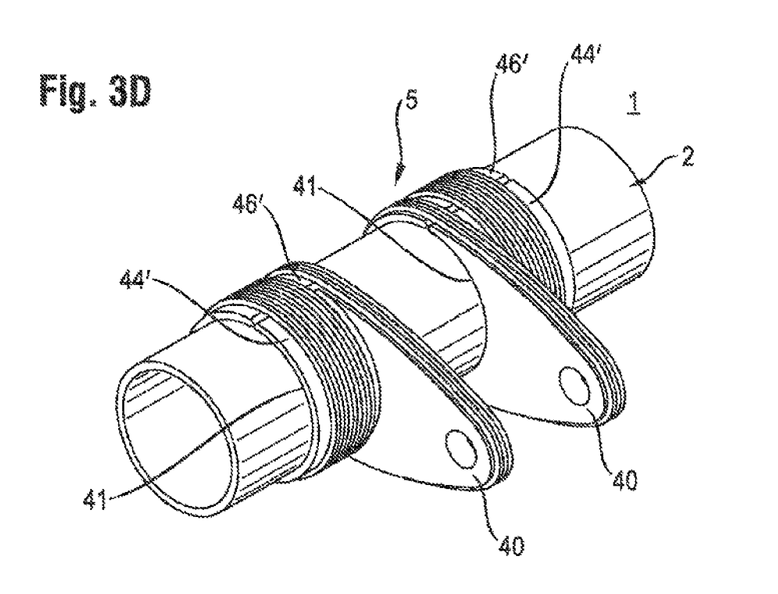

A further variant of the assembly according to the invention is shown in FIG. 3D, the connecting element 4 differing from that from FIG. 3C in that the attachment portions 40 and corresponding outer portions 44' are not connected via a connecting portion 45. That is to say that the attachment portions 40, as in the variant of the connecting element 4 from FIG. 1, are not connected to one another. Each of the outer portions 44' which extend in the longitudinal direction on mutually opposed sides of the attachment portions 40 include a counter-element 46', which counter-elements are supplemented with the corresponding outer portions 44' in such a way that they together encircle the frame element 2.

In the variant shown in FIG. 3D, the fiber winding 5 includes four windings, with in each case a winding extending around the outer portions 44' and the corresponding counter-elements 46' and in each case a winding extending around the attachment portions 40 and the corresponding counter-element 46'.

Figure 3E:
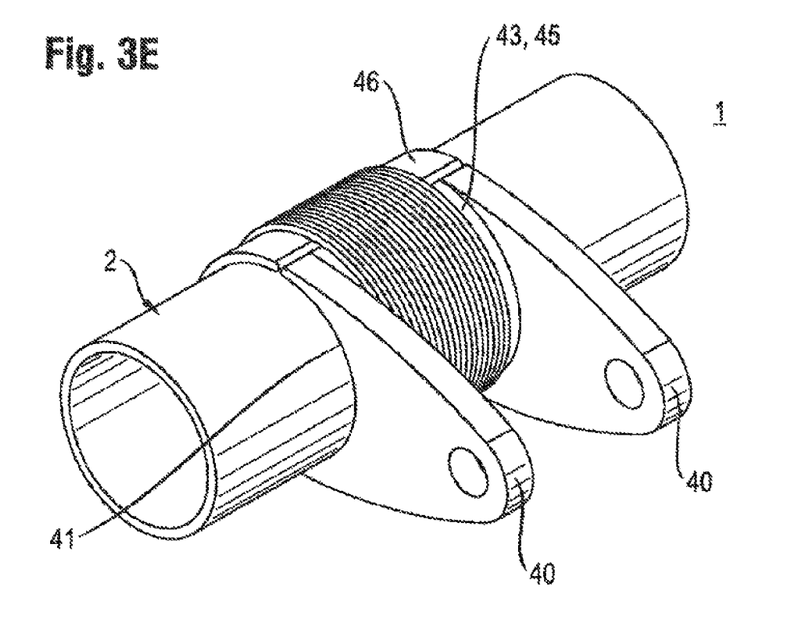

A further variant of the assembly according to the invention is shown in FIG. 3E, this differing from that illustrated in FIG. 3C in that the connecting element 4 does not include outer portions 44 and only a single winding is present between the attachment portions 40.

As is evident from the above explanation with respect to FIGS. 3A to 3E, the bearing surfaces 41 of the connecting element 4 which are directed toward the frame element 2 are formed in the X-Z plane such that they are adapted to the circular cross section of the frame element 2.

However, for all the above-explained variants, the cross section of the frame element 2 and the bearing surface 41 of the connecting element 4 can also be configured such that a form fit is produced between the frame element 2 and the connecting element 4 in the assembled state. This is shown in FIG. 3F.

Figure 3F:
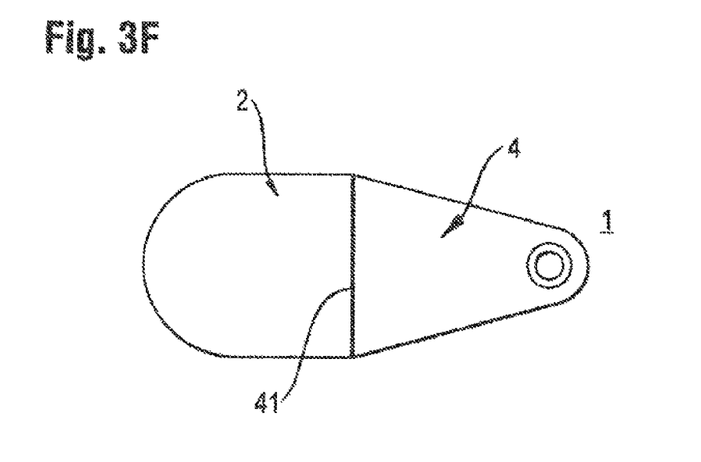

The view shown in FIG. 3F corresponds to the X-Z plane, it emerging therefrom that the frame element 2 has a circular arc-shaped portion and a linear portion in cross section. That is to say that the frame element 2 includes a circular arc-shaped surface and a planar surface against which the connecting element 4 bears by way of its bearing surface 41. It is advantageously ensured by the form fit produced as a result that no twisting of the connecting element 4 with respect to the frame element 2 occurs when a high degree of force is introduced.

The link 3 or the component can be mounted on all the above-explained connecting elements 4 via a screw connection.

In the case of all the assemblies, no elastomer bearing is provided on the screw connection 6 since the corresponding function is realized by the material-related and geometric configuration of the connecting element 4 and/or of the integrally bonded connection between the frame element 2 and the connecting element 4.

In particular, all of the explanations given before the description of the figures, in particular with regard to the modulus of elasticity, materials of the frame element and connecting element, and the fiber winding correspondingly apply to the above-explained variants of the assembly 1 according to the invention.

Figure 4:
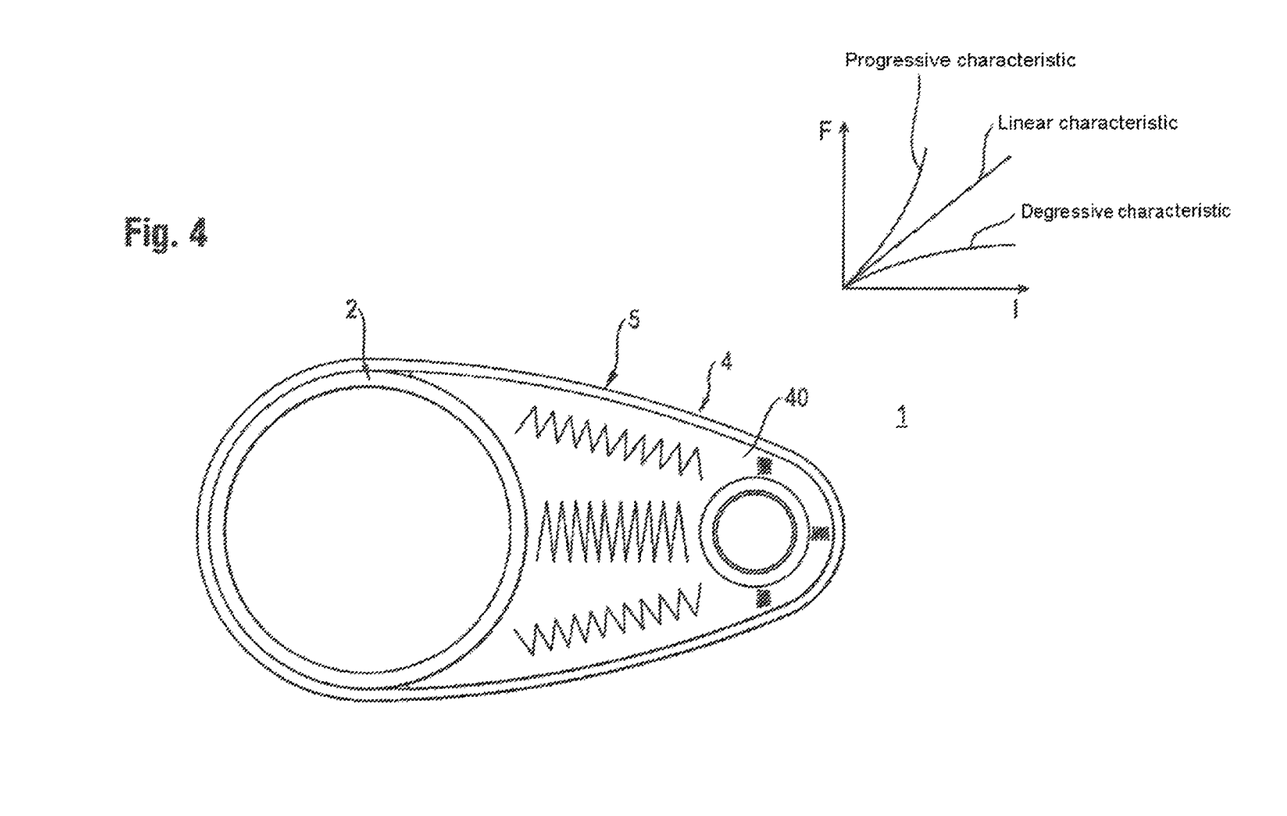
FIG. 4 shows the assembly according to an embodiment of the invention, the connecting element being formed from an elastomer.

In the assembly 1 shown in FIG. 4, the connecting element 4 is formed from an elastomer or a very stiff adhesive (which itself may be an elastomer) which each have a modulus of elasticity that is less than the modulus of elasticity of the material of the link 3. In the variant shown in FIG. 4, the connecting element 4 which is formed from the elastomer or very stiff adhesive assumes the function of the elastomer bearing. The connecting element 4 or the attachment portions 40 is/are fastened to the frame element 2 via an integrally bonded connection, for example an adhesive layer. If the elastomer of the connecting element itself assumes the function of the adhesive, the connecting element can be fastened directly to the frame element. FIG. 4 schematically shows spring elements which schematically indicate the elastic behavior of the connecting element 4. The connecting element 4 can be geometrically formed in dependence on the force to be introduced via the component 3 or the link 3 such that it has a force-extension characteristic likewise illustrated in FIG. 4. That is to say that, on account of the geometry of the connecting element 4 and the material-related configuration, the connecting element can have a degressive, linear or progressive force-extension characteristic.

For better mounting of the screw connection 6, a ring can also be inserted into the corresponding through-opening of the connecting element 4. This ring can be formed from metal or a plastic.

Figure 5:
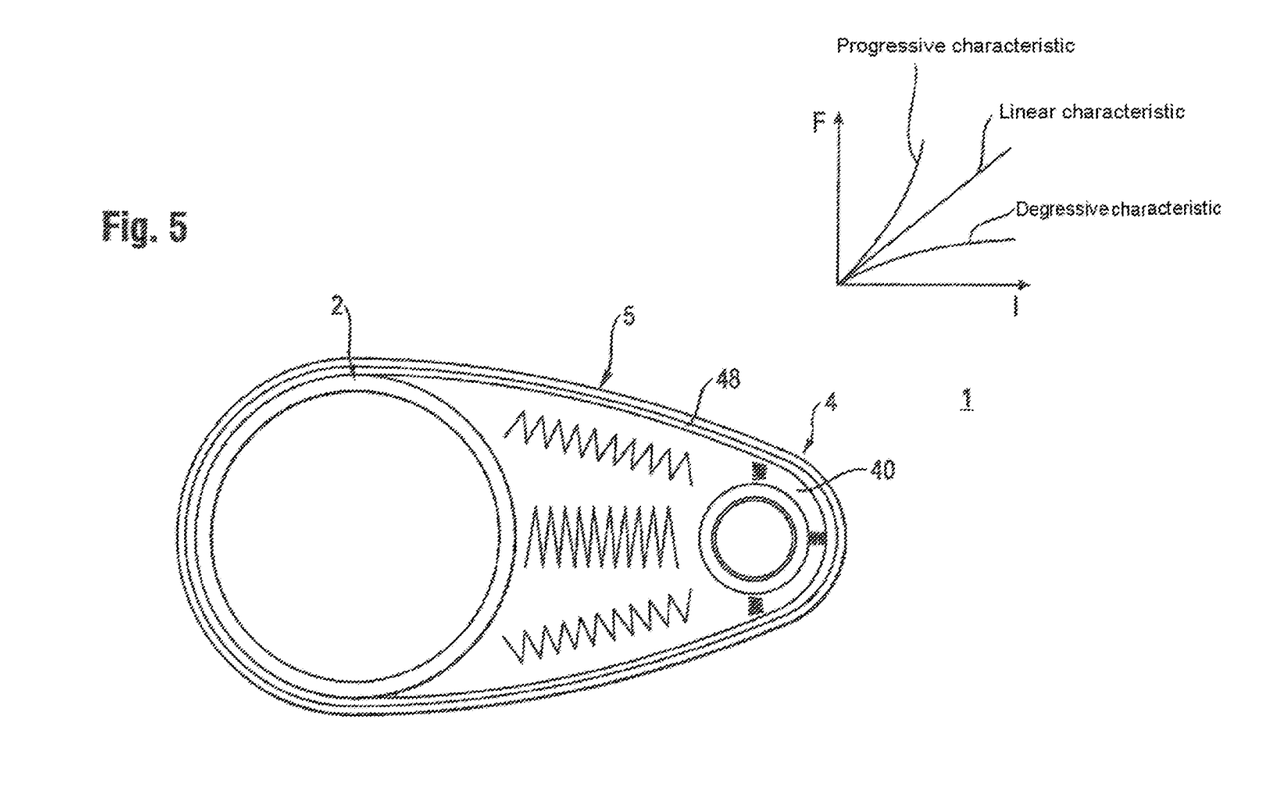
FIG. 5 shows the assembly according to an embodiment of the invention, the connecting element being formed from an elastomer and the frame element and the connecting element being surrounded by an envelope.

A variant of the assembly 1 according to the invention is shown in FIG. 5, the material-related and geometrical configuration of the connecting element 4, the frame element 2 and the fiber winding 5 being identical to that from FIG. 4. The variant shown in FIG. 5 differs from that shown in FIG. 4 in that the connecting element 4 is surrounded by an envelope 48 which at least surrounds or envelops the outer surface of the frame element 2 and the connecting element 4, over which outer surface the fiber winding 5 extends.

Figure 6:
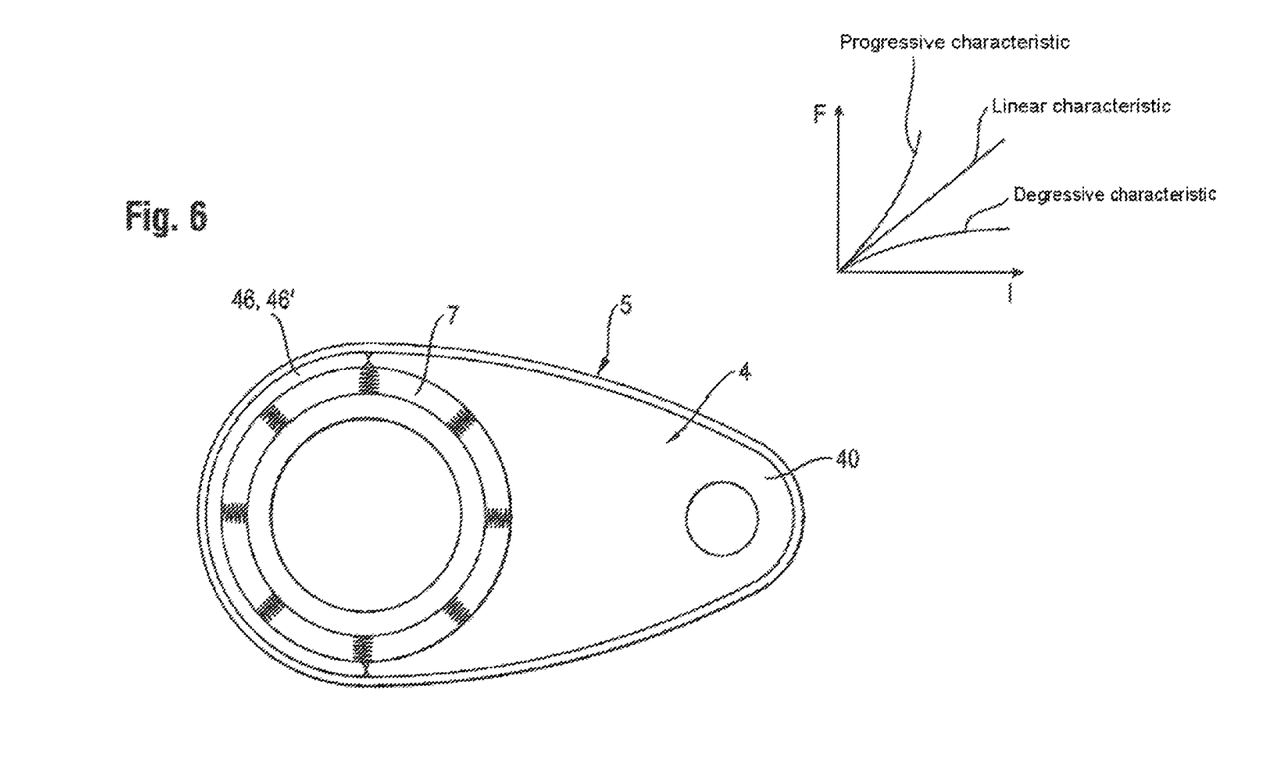
FIG. 6 shows the assembly according to an embodiment of the invention, the connecting element being formed from a metal and a thick adhesive layer being formed between the frame element and the connecting element to perform the function of an elastomer bearing.

A further variant of the embodiment according to the invention is shown in FIG. 6. In this variant, the connecting element 4 is formed from a metal and also has the counter-element 46, 46' shown in FIGS. 3C to 3E. In this respect, the connecting element 4 completely encircles the frame element 2.

Alternatively, the connecting element 4 can equally be formed from a fiber-reinforced plastic.

An adhesive layer 7 which assumes the function of an elastomer bearing is formed between the connecting element 4 and the frame element 2. When the corresponding adhesive 7 or the adhesive layer is in the cured state, it has a modulus of elasticity which is lower than that of the fastened link 3 or component. The modulus of elasticity of the adhesive layer has a value of ≤100 MPa and the adhesive layer preferably has a thickness of up to 10 mm.

The connecting element 4 and the adhesive layer 7 can be geometrically formed such that the adhesive layer has a force-extension characteristic corresponding to an elastomer bearing. This characteristic can be a degressive, linear or progressive characteristic (see also FIG. 6).

Figure 7:
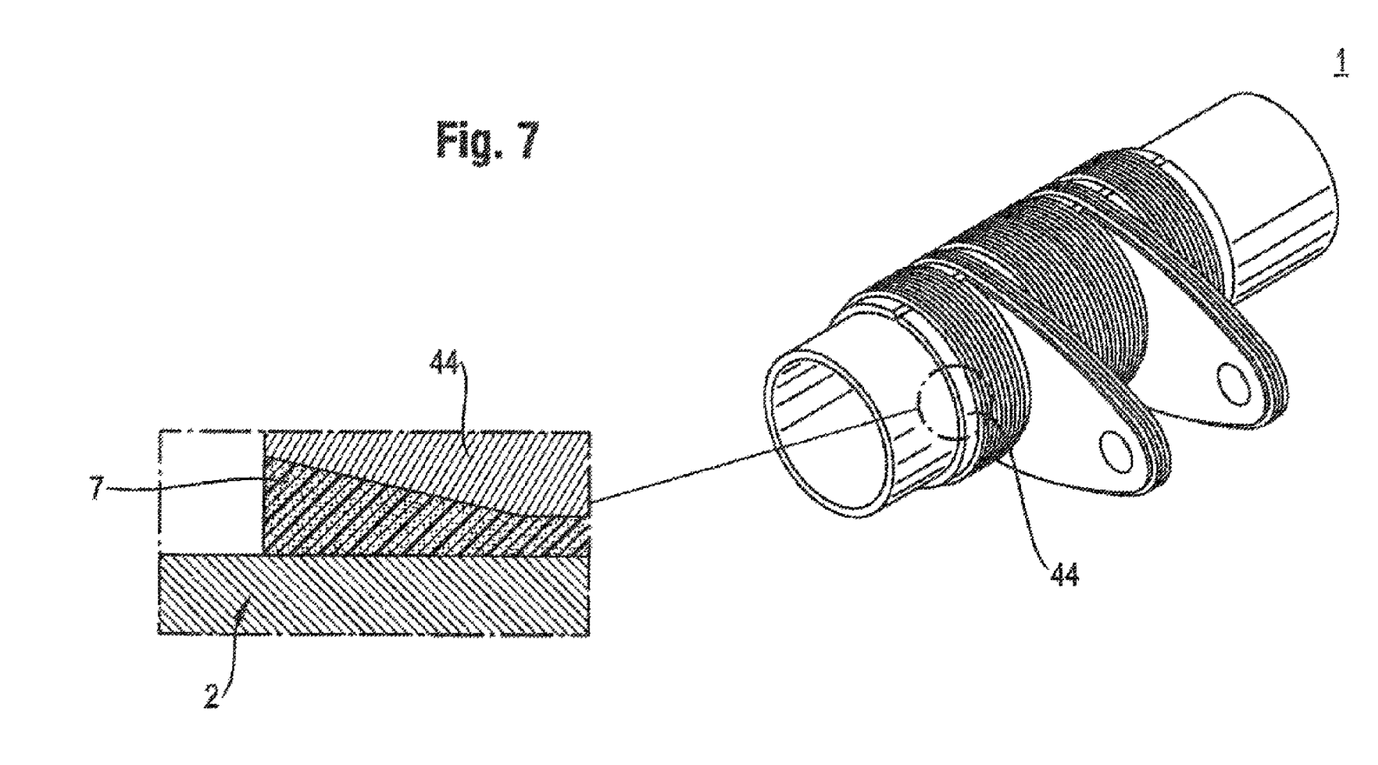
FIG. 7 shows enlarged illustrations of an adhesive layer situated between the connecting element and the frame element.

The structure of the adhesive layer between the bearing surface of the connecting element 4 and the frame element 2 is illustrated in enlarged form in FIG. 7. The assembly 1 according to the invention, which is likewise illustrated, corresponds to that shown in FIG. 3C, the configuration of the adhesive layer not being limited to this variant but being applicable to all the variants. As shown in FIG. 7, the outer portion 44 of the connecting element 4 is configured at the end portions situated in the longitudinal direction such that the adhesive layer or the quantity of the adhesive 7 increases at the end portions. This can be achieved, for example, by stepped or continuous/linear beveling of the outer portion 44.

In addition, it is possible for an excess of the adhesive to be applied in such a way that a bead is formed at the end portions.

These configurations of the adhesive layer ensure that peak stresses at the end portions are reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An assembly, comprising:
a frame element of a motor vehicle;
a connecting element fastened to the frame element; and
a component fastened for rotation relative to the connecting element, wherein
a modulus of elasticity of at least one of: (i) an integrally bonded connection provided between the connecting element and the frame element, and (ii) the connecting element, is less than a modulus of elasticity of the component fastened to the connecting element.

2. The assembly according to claim 1, wherein the integrally bonded connection and/or the connecting element are geometrically formed such that the integrally bonded connection and/or the connecting element have a force-extension characteristic of an elastomer bearing.

3. The assembly according to claim 1, wherein the connecting element is formed of an elastomer.

4. The assembly according to claim 1, wherein the integrally bonded connection is formed of a low-modulus adhesive.

5. The assembly according to claim 3, wherein the integrally bonded connection is formed of a low-modulus adhesive.

6. The assembly according to claim 1, wherein the connecting element is formed of an elastomer and is surrounded by an envelope having a modulus of elasticity greater than the modulus of elasticity of the elastomer.

7. The assembly according to claim 5, wherein the connecting element is formed of an elastomer and is surrounded by an envelope having a modulus of elasticity greater than the modulus of elasticity of the elastomer.

8. An assembly, comprising:
a frame element of a motor vehicle;
a connecting element fastened to the frame element and a component fastened to the connecting element, wherein
a modulus of elasticity of at least one of: (i) an integrally bonded connection provided between the connecting element and the frame element, and (ii) the connecting element, is less than a modulus of elasticity of the component fastened to the connecting element, and wherein
the integrally bonded connection is formed of an adhesive and the connecting element is formed of metal, and
an adhesive layer formed from the adhesive and arranged between the frame element and the connecting element has a thickness of up to 10 mm.

9. The assembly according to claim 6, wherein:
the integrally bonded connection is formed of an adhesive and the connecting element is formed of metal, and
an adhesive layer formed from the adhesive and arranged between the frame element and the connecting element has a thickness of up to 10 mm.

10. An assembly, comprising:
a frame element of a motor vehicle;
a connecting element fastened to the frame element and a component fastened to the connecting element, wherein
a modulus of elasticity of at least one of: (i) an integrally bonded connection provided between the connecting element and the frame element, and (ii) the connecting element, is less than a modulus of elasticity of the component fastened to the connecting element, wherein
the connecting element is formed of an elastomer, and wherein
the connecting element has a through-opening at which the component is fastened via a screw connection, and a reinforcing ring is inserted in the through-opening.

11. The assembly according to claim 6, wherein:
the connecting element has a through-opening at which the component is fastened via a screw connection, and a reinforcing ring is inserted in the through-opening.

12. The assembly according to claim 1, further comprising a fiber winding by which the connecting element is fastened to the frame element in addition to the integrally bonded connection.

13. An assembly comprising:
a frame element of a motor vehicle;
a connecting element fastened to the frame element and a component fastened to the connecting element, wherein
a modulus of elasticity of at least one of: (i) an integrally bonded connection provided between the connecting element and the frame element, and (ii) the connecting element, is less than a modulus of elasticity of the component fastened to the connecting element, and wherein the integrally bonded connection is formed of an adhesive, the frame element extends in a longitudinal direction, and an adhesive layer formed from the adhesive and arranged between the frame element and the connecting element is provided such that a quantity of the adhesive increases at end portions of the connecting element located in the longitudinal direction.

14. A motor vehicle, comprising:

a chassis, the chassis comprising a frame element and a connecting element fastened to the frame element;

a vehicle component fastened for rotation relative to the connecting element and to the chassis via the connecting element, the vehicle component having a defined modulus of elasticity, wherein an integrally bonded connection provided between the connecting element and the frame element of the chassis, and/or the connecting element itself, is formed to have a defined modulus of elasticity that is less than the defined modulus of elasticity of the vehicle component fastened to the chassis.

15. The motor vehicle according to claim 14, wherein the integrally bonded connection and/or the connecting element itself have a defined geometric characteristic so as to have a force-extension characteristic of an elastomer bearing.

16. The motor vehicle according to claim 15, wherein the connecting element is made of an elastomer.

17. The motor vehicle according to claim 16, wherein the integrally bonded connection is made of a low-modulus adhesive.

* * * * *